Feb. 20, 1940.  V. D. BARKER  2,190,820
CONTROL APPARATUS
Filed Feb. 11, 1936  2 Sheets-Sheet 1

INVENTOR
V. D. BARKER
BY E. R. Nowlan
ATTORNEY

Feb. 20, 1940. V. D. BARKER 2,190,820
CONTROL APPARATUS
Filed Feb. 11, 1936 2 Sheets-Sheet 2
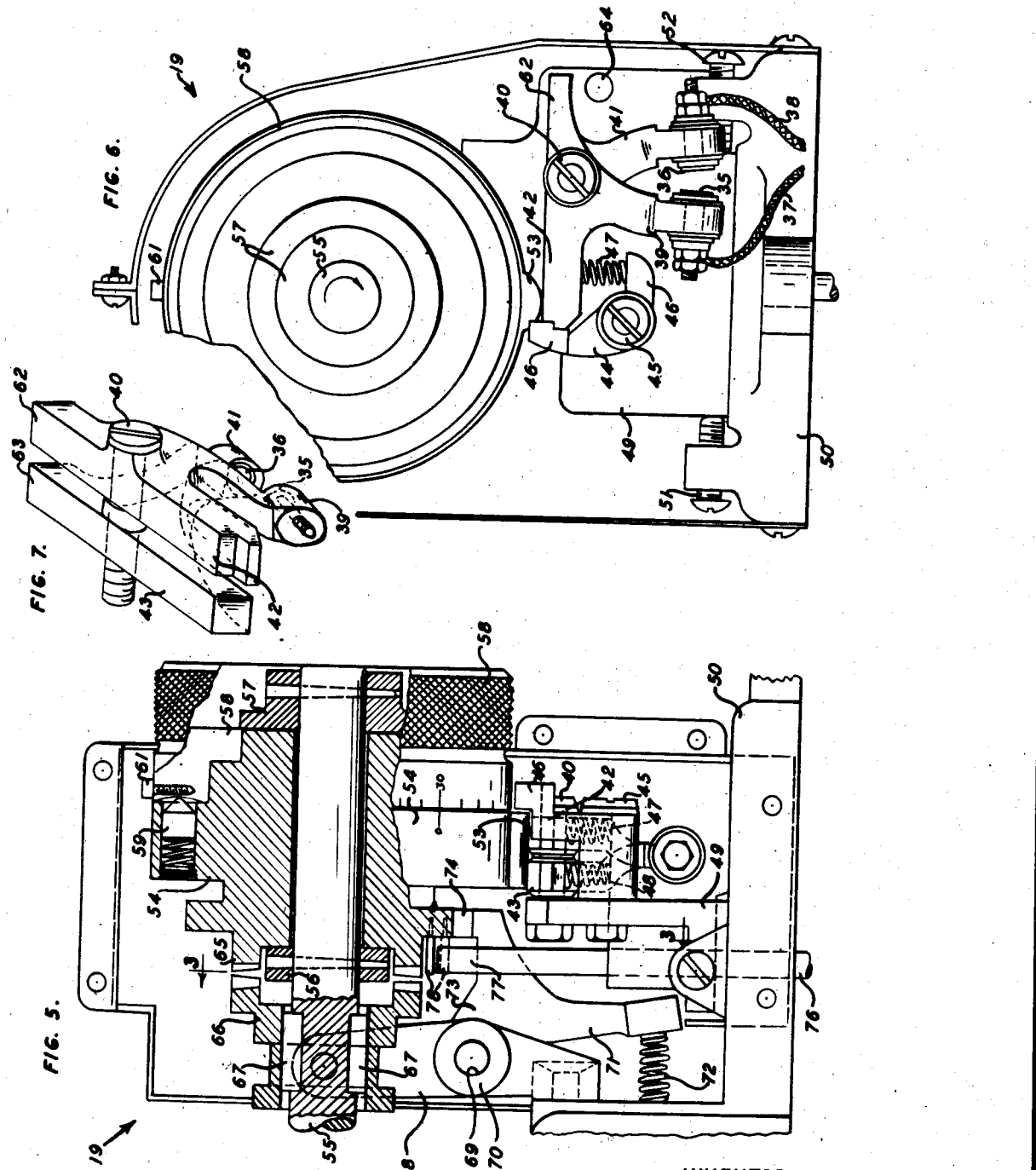
INVENTOR
V. D. BARKER
BY
E. R. Nowlan
ATTORNEY Patented Feb. 20, 1940

2,190,820

UNITED STATES PATENT OFFICE 2,190,820

CONTROL APPARATUS

Virgil D. Barker, Westfield, N. J., assignor to Western Electric Company, Incorporated, New York, N. Y., a corporation of New York Application February 11, 1936, Serial No. 63,456

11 Claims. (Cl. 200—33)

This invention relates to control apparatus and more particularly to apparatus for controlling the power current in electrical welding apparatus.

In electrical welding apparatus and especially in electrical spot welding machines it is important to be able to control in an accurate and adjustable manner, the time period during which welding current is supplied to the welding electrodes while in operation.

An object of the present invention is to provide a simple, reliable, adjustable and accurately operating apparatus to close an electric circuit for an adjustably predetermined period of time.

In one embodiment of the invention a welding machine has a pair of resiliently mounted independently movable contacts to close and open the power circuit, the two contacts being held open, allowed to close, forced open, and reset in their original positions by a pair of rotatable actuating members driven by a one revolution clutch from a uniformly rotating shaft, the two actuating members being adjustable relatively to each other to vary the several time periods involved in one cycle of operation.

Other objects and features of the invention will appear from the following detailed description of one embodiment thereof taken in connection with the accompanying drawings in which the same reference numerals are applied to identical parts in the several figures and in which—

Fig. 5 is a broken view partly in longitudinal vertical section of the control mechanism proper;

Fig. 6 is a broken view thereof in front elevation, and

Fig. 7 is a detached view in perspective of the control contacts and associated parts.

Figure 1:
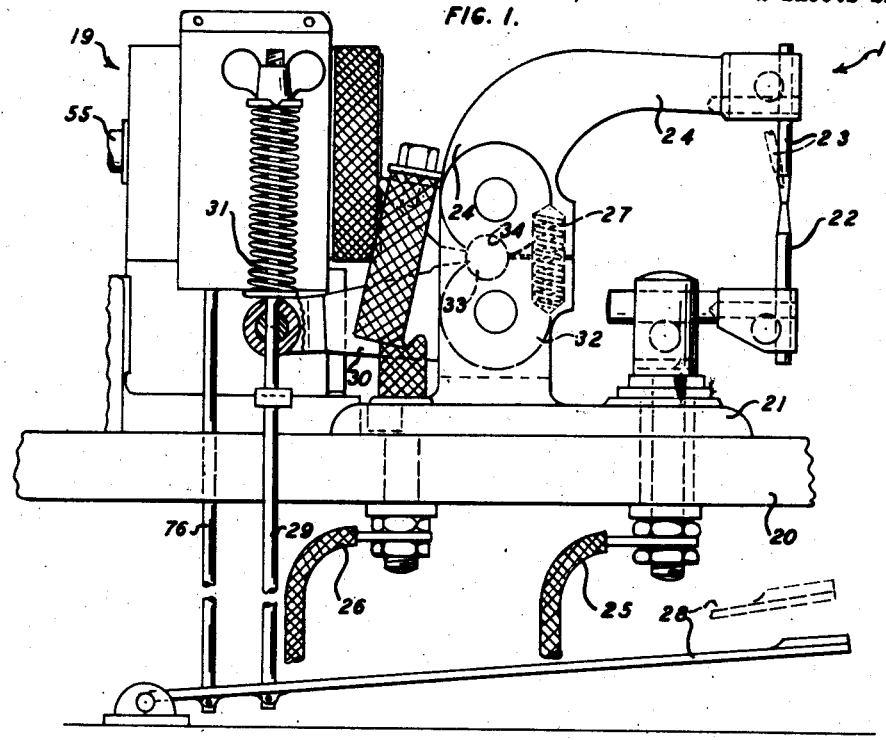
Fig. 1 is a partly diagrammatic broken view in side elevation of a welding machine embodying the invention.
Figure 2:
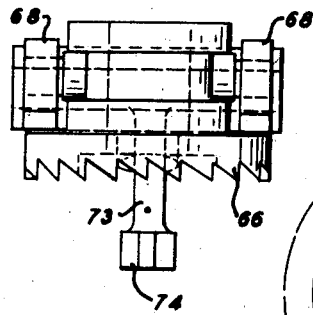
Fig. 2 is a detached plan view of the clutch member and associated parts.

In the embodiment herein disclosed, a spot welding machine generally indicated at 18 is mounted on a bench, bracket or other suitable support having a table member 20. The welder proper has a base 21 on which is mounted a stationary electrode 22. A movable coacting electrode 23 is carried by a pivotable arm 24 mounted on the base 21. Welding current is fed to the electrodes 22 and 23 by cables 25 and 26 from the secondary winding of a step down transformer not shown. The arm 24 is held up and the electrode 23 out of contact with the electrode 22 by a helical compression spring 27. When it is desired to bring the electrodes together, the treadle 28 is depressed from the dotted to the full line position shown in Fig. 1. This draws the pull rod 29 down, which in turn depresses the lever arm 30 through the adjustable compression spring 31. The lever 30 rotates the circular cam 32 in which is inset the cam member 33 which takes into a corresponding cam notch 34 in the pivotable arm 24 and rotates the arm to bring the electrode 23 down toward the electrode 22 and against work not shown resting on the latter.

It is desired that during each approximation of the electrodes electrical welding current be supplied to them for one and only one period of time of adjustably predetermined length. To this end a control mechanism generally indicated at 19 is associated with the welder 18. In the control device 19 there is a pair of coacting contacts 35 and 36 connected by leads 37 and 38 in the primary circuit of the step down transformer not shown whose secondary is connected to the electrodes 22 and 23 by the cables 25 and 26, so that while the contacts 35 and 36 are abutted together, the primary circuit is closed and welding current is fed by the secondary to the electrodes 22 and 23.

The contact 35 is mounted in the downwardly extending arm 39 of a bell crank lever pivoted on a stub shaft 40 rigidly mounted in the frame of the mechanism. The contact 36 is mounted in the downwardly extending arm 41 of a second bell crank lever pivoted on the same stub shaft, the arm 39 and the arm 41 being laterally offset in opposite directions to bring the contacts into the same plane of rotation about the shaft. The horizontal arms 42 and 43 respectively belonging to the arms 39 and 41 extend horizontally from the shaft to the left (Fig. 6) side by side. The outer end of the arm 42 is notched to coact with a detent 44 pivotably mounted on a stub 45 carried on the machine frame. The head 46 of the detent is laterally offset and covers only a portion of the width of the arm 42 at the outer side of the arm and extends outwardly beyond the same.

A bracket 46 is formed on the machine frame and serves as a common abutment for the lower ends of two compression springs 47 and 48 whose upper ends bear respectively against the under faces of the arms 42 and 43. That portion 49 of the machine frame which carries the stubs 40 and 45 and the bracket 46 is adjustable on the control mechanism base 50 by means of opposed clamp screws 51 and 52. The two bell crank levers 39, 42 and 41, 43 have third arms 62 and 63, and a stop member 64 is mounted on the movable part of the frame. Thus this latter may be removed to adjust, replace or repair the contacts 35 and 36 conveniently.

The arms 42 and 43 are normally held down in the position shown in Fig. 6, with contacts 35 and 36 apart, by a cam nose 53 formed on a circular rotary cam 54 mounted on a shaft 55 with freedom to rotate thereon but held against motion longitudinal thereof by collars 56 and 57 pinned on the shaft. The shaft 55 is journalled in bearings not shown on the machine frame and is driven at constant speed of rotation preferably by a synchronous electric motor also not shown. An adjustable timing collar 58 is rotatably mounted on a forwardly extending reduced portion of the cam 54 and held thereon by the collar 57. The collar 58 is yieldably held against rotation on the cam 54 by means of a spring pressed cone pointed detent 59 mounted in the cam and coacting with an annularly positioned sequence 60 of radially disposed notches formed on the rear face of the collar 58. The contact surface of the rear face of the collar 58 with the cam 54 is substantially in the plane of the front face of the arm 42. A screw having a head 61 is mounted in the cylindrical outer surface of the collar 58 so that the head 61 projects radially outwardly from the collar so as to contact with and trip the detent 46 when carried down to and past the same.

The rear end of the cam 54 is formed with clutch teeth 65 and a set of coacting teeth is formed on the forward end of a clutch member 66 mounted on the shaft 55 to be longitudinally slidable thereon, but keyed thereto by keys 67 to rotate therewith. The clutch member 66 is slid on the shaft by means of twin lever arms 68 pivoted in brackets on the machine frame by means of a shaft 69 passing through a body 70 integral with the arms 68. A downwardly extending arm 71 also integral with the body 70 is constantly urged forward by a compression spring 72 thus tending to keep the clutch member 66 out of engagement with the cam 54. Another forwardly extending arm 73 also integral with the body 70 is formed at its outer end with an upwardly directed nose 74 which enters a corresponding notch 75 in the periphery of a portion of the cam 54.

A pullrod 76 attached at its lower end to the treadle 28, passes up through a guide hole in the base 50 and is formed at its upper end with a hook or detent 77 capable of hooking over the arm 73 to pull the same down. The upper portion of the pullrod 76 is resilient to permit the detent 77 to be pushed off the arm 73 by a pin 78 mounted in the cam 54.

In operation, the motor driving the shaft 55 is started, a piece of work to be welded is placed on the electrode 22, the electrode 23 being in the inoperative position shown in dotted lines in Fig. 1, and the treadle 28 is depressed. The pullrod 29 pulls the arm 30 down and revolves the cam piece 32 to drive the arm 24 down against the spring 27 and so to apply the electrode 23 to the work. Further motion of the treadle beyond this point is permitted by the interposition of the spring 31 between the pullrod 29 and the arm 30.

Figure 3:
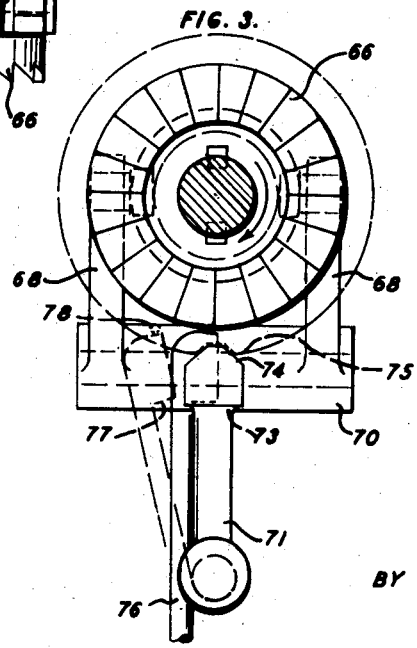
Fig. 3 is a view on the broken line 3—3 of Fig. 1.
Figure 4:
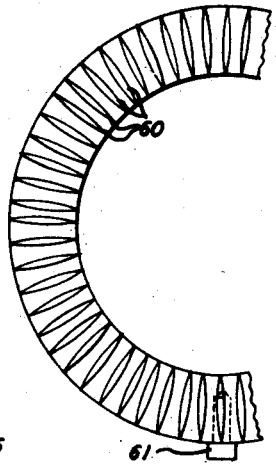
Fig. 4 is a partial view in rear elevation of the adjustment collar.

When the treadle has advanced a little further (how far depending upon the adjustment of tension of the spring 31) the pullrod 76 will release the nose 74 from the notch 75 by pulling down the lever arm 73 against the spring 72. At the same time the arms 68 will move the clutch member 66 to engage the cam 54 and start the same to rotating in the direction of the arrow in Figs. 3 and 6. This rotation will continue until the pin 78 has made nearly one revolution with the cam 54 and strikes the right side of the detent 77 (Fig. 3) dislodging the detent from the lever arm 73. The latter at once flies up under the drive of the spring 72, the nose 74 enters the notch 75, and the cam is thus stopped after one revolution. This is possible because, as the arm 73 rises, the arms 68 are also moved to shift and hold the clutch member 66 out of engagement with the cam 54.

When the cam 54 begins to revolve (which is not until after the electrode 23 has been applied to the work) the cam nose 53 leaves the arms 42 and 43. The arm 42 is held in place against the drive of its spring 47 by the detent 46, but the arm 43 is driven up by the spring 48. This action swings the contact 36 on the arm 41 to the left into contact with the contact 35, which closes the primary circuit of the welding transformer through the leads 37 and 38 and causes the secondary winding of the transformer to begin delivering current to the electrodes 22 and 23 through the cables 25 and 26. The lever 43, 41 is held in this position by the pressure of contact 36 against contact 35, and the arm 63 is then very nearly down on the stop 64 while the top of the arm 43 is out of contact with the cam 54. This state of affairs continues until the screw head 61 is carried around by the cam and pushes the detent 46 off the arm 42.

Immediately the arm 42 flies up under the drive of the spring 47, the arm 39 carries the contact 35 abruptly away from the contact 36 and the arms 62 and 63 come down on and stop against the stop member 64. The supply of current to the transformer primary is thus broken at 35, 36 and hence the welding current also ceases.

Later the cam nose 53 returns the levers 39, 42, 62 and 41, 43, 63 to their first positions just as the nose 74 stops the revolution of the cam.

The clutch 66 will not be again engaged with the cam 54 until the pullrod 76 has been permitted to rise to allow its resiliently flexible upper end to reset the hook 77 over the lever arm 73. Each depression of the treadle will occasion one and only one approximation of the electrodes and during this will effect one and only one revolution of the cam 54 and therefore one and only one application of welding current to the electrodes.

The length of the time of closure of the welding circuit depends upon the rotary speed of the shaft 55 and upon the peripheral distance around the cam 54 and the collar 58 from the cam nose 53 to the screw head 61, for when the nose releases the arm 43 the welding circuit is closed until the screw head strikes the detent 46 and releases the arm 42. The distance between the cam nose and the screw head can be adjusted by turning the sleeve 58, which carries the screw head, manually on the cam 54 which carries the cam nose, the resilient detent 59 yielding to allow of such adjustment but holding the parts relatively immovable in operation. This adjustment has an angular range about the common axis of the parts from a minimum of 6° to a maximum of 342° by steps of 6° in the structure shown where the adjustment notches

60 are 6° apart. This represents a minimum of one sixtieth and a maximum of fifty seven sixtieths of a revolution of parts 54 and 58. In one instance in practice the shaft 55 was driven by a synchronous motor at 30 R. P. M. The welding current period, therefore, could be adjusted by steps of two cycles from a minimum of two cycles to a maximum of 114 cycles of 60 cycle current.

The invention is disclosed herein as embodied in a timing device for a welding machine but is not limited to such application but is obviously of use wherever it is desired to close an electrical circuit for an accurately predeterminable and adjustable period of time. The embodiment herein disclosed is illustrative only and may be widely modified and departed from in many ways without departing from the spirit and scope of the invention as pointed out in and limited only by the appended claims.

What is claimed is:

1. A control device to close an electric circuit for a predeterminable interval of time comprising a first spring pressed rotary member having a contact member thereon and tending to rotate from one position to another position, a second spring pressed rotary member having a contact member thereon and tending to rotate from one position to another position, a detent to hold the second rotary member releasably in the first position thereof, and a rotatable member actuable at will for one cycle of operation only and having a cam thereon to move both rotary members from their second positions to their first positions and to hold the first rotary member releasably in the first position thereof and having releasing means thereon to release the second rotary member from the detent, the contact member on the first rotary member being in contact with the contact member on the second rotary member only when the first rotary member is in its second position and the second rotary member is in its first position.

2. A control device to close an electric circuit for a predeterminable interval of time comprising a first spring pressed rotary member having a contact member thereon and tending to rotate from one position to another position, a second spring pressed rotary member having a contact member thereon and tending to rotate from one position to another position, a detent to hold the second rotary member releasably in the first position thereof, a rotatable member actuable at will for one cycle of operation only and having a cam thereon to move both rotary members from their second positions to their first positions and to hold the first rotary member releasably in the first position thereof and having releasing means thereon to release the second rotary member from the detent, the contact member on the first rotary member being in contact with the contact member on the second rotary member only when the first rotary member is in its second position and the second rotary member is in its first position, and constant speed means to drive the rotatable member.

3. A control device to close an electric circuit for a predeterminable interval of time comprising a first spring pressed rotary member having a contact member thereon and tending to rotate from one position to another position, a second spring pressed rotary member having a contact member thereon and tending to rotate from one position to another position, a detent to hold the second rotary member releasably in the first position thereof, a rotatable member having a cam thereon to move both rotary members from their second positions to their first positions and to hold the first rotary member releasably in the first position thereof and having releasing means thereon to release the second rotary member from the detent, the contact member on the first rotary member being in contact with the contact member on the second rotary member only when the first rotary member is in its second position and the second rotary member is in its first position, constant speed means, and means to couple the constant speed means to the rotatable member at will to drive the rotatable member for one rotation thereof only.

4. A control device to close an electric circuit for a predeterminable interval of time comprising a first spring pressed rotary member having a contact member thereon and tending to rotate from one position to another position, a second spring pressed rotary member having a contact member thereon and tending to rotate from one position to another position, a detent to hold the second rotary member releasably in the first position thereof, a rotatable member having a cam thereon to move both rotary members from their second positions to their first positions and to hold the first rotary member releasably in the first position thereof and having releasing means thereon to release the second rotary member from the detent, the contact member on the first rotary member being in contact with the contact member on the second rotary member only when the first rotary member is in its second position and the second rotary member is in its first position, and means to drive the rotatable member at will for one rotation thereof only at predetermined speed.

5. A control device to close an electric circuit for a predeterminable interval of time comprising a first spring pressed rotary member having a contact member thereon and tending to rotate from one position to another position, a second spring pressed rotary member having a contact member thereon and tending to rotate from one position to another position, a detent to hold the second rotary member releasably in the first position thereof, a movable member having a cam thereon to move both rotary members from their second positions to their first positions and to hold the first rotary member releasably in the first position thereof and having releasing means thereon to release the second rotary member from the detent, the contact member on the first rotary member being in contact with the contact member on the second rotary member only when the first rotary member is in its second position and the second rotary member is in its first position, and means to drive the movable member at will for one cycle of movement thereof only at predetermined speed.

6. A control device to close an electric circuit for a predeterminable interval of time comprising a first spring pressed shiftable member having a contact thereon and tending to shift from one position to another position, a second pressed shiftable member having a contact thereon and tending to shift from one position to another position, a detent to hold the second shiftable member in the first position thereof, a movable member having means thereon to move both shiftable members from their second positions to their first positions and to hold the first shiftable member releasably in the first position thereof and having releasing means thereon to release the second shiftable member from the detent, the contact on the first shiftable member being in contact with the contact on the second shiftable member only when the first shiftable member is in its second position and the second shiftable member is in its first position, and means to drive the movable member at will for one cycle of movement thereof only at predetermined speed.

7. A control device to close an electric circuit for a predeterminable interval of time comprising a first contact member tending to shift from one position to another position, a second contact member tending to shift from one position to another position, means to releasably hold the second contact member in its first position, a movable member having means thereon to move both shiftable members from their second positions to their first positions and to hold the first shiftable member releasably in the first position thereof and having releasing means thereon to release the second shiftable member from the holding means, the two contact members being in contact with each other only when the first contact member is in its second position and the second contact member is in its first position, constant speed means, and means to couple the movable member at will to the constant speed means to drive the movable member for one cycle of movement only.

8. A control device to close an electric circuit for a predeterminable interval of time comprising a first contact member tending to shift from one position to another position, a second contact member tending to shift from one position to another position, means to releasably hold the second contact member in its first position, a movable member having means thereon to move both shiftable members from their second positions to their first positions and to hold the first shiftable member releasably in the first position thereof and having releasing means thereon to release the second shiftable member from the holding means, the two contact members being in contact with each other only when the first contact member is in its second position and the second contact member is in its first position, and means to drive the movable member at will for one cycle of movement only at predetermined speed.

9. A control device to close an electric circuit for a predeterminable interval of time comprising coaxially movable contact members having projections, resilient means for urging each contact member in one direction, constant speed means, a contact control element positioned to engage the projections to hold the contact members in spaced positions against the force of their resilient means, means for operatively connecting the element to the constant speed means to cause movement of the element to release the contact members, auxiliary means to hold one of the contact members against movement while the first released contact member is urged into engagement therewith by its resilient means, and means adjustable relative to the element and movable therewith to actuate the auxiliary means to render effective the resilient means of the second contact member to urge said member away from the first released contact member.

10. A control device to close an electric circuit for a predeterminable interval of time comprising coaxially movable contact members having projections, resilient means for urging each contact member in one direction, constant speed means, a contact control element positioned to engage the projections to hold the contact members in spaced positions against the force of their resilient means, means for operatively connecting the element to the constant speed means to cause movement of the element to release the contact members, auxiliary means to hold one of the contact members against movement while the first released contact member is urged into engagement therewith by its resilient means, means for limiting the movement of the first released contact member, and means adjustable relative to the element and movable therewith to actuate the auxiliary means to render effective the resilient means of the second contact member to move said member away from the first released member by its resilient means.

11. A control device to close an electric circuit for a predeterminable interval of time comprising coaxially movable contact members having projections, resilient means for urging each contact member in one direction, constant speed means, a contact control element positioned to engage the projections to normally hold the contact members in spaced positions against the force of their resilient means, means for operatively connecting the element to the constant speed means to cause a predetermined movement of the element relative to the projections to release the contact members, auxiliary means to hold one of the contact members against movement while the first released contact member is urged into engagement therewith by its resilient means, means for limiting the movement of the first released contact member, and means adjustable relative to the element and movable therewith to actuate the auxiliary means to render effective the resilient means of the second contact member to move said member away from the first released contact member by its resilient means, said element being conditioned to return the contact members to their normal positions at the termination of its movement.

VIRGIL D. BARKER.